United States Patent
Urade et al.

(10) Patent No.: US 11,952,539 B2
(45) Date of Patent: Apr. 9, 2024

(54) CONVERSION OF BIOMASS OR RESIDUAL WASTE MATERIAL TO BIOFUELS

(71) Applicant: SHELL OIL COMPANY, Houston, TX (US)

(72) Inventors: Vikrant Nanasaheb Urade, Bangalore (IN); Alan Anthony Del Paggio, Sprint, TX (US); Madhusudhan Rao Panchagnula, Bangalore (IN); Laxmi Narasimhan Chilkoor Soundararajan, Bangalore (IN); Srikant Gopal, Bengaluru (IN)

(73) Assignee: SHELL USA, INC., Houston, TX (US)

(*) Notice: Subject to any disclaimer, the term of this patent is extended or adjusted under 35 U.S.C. 154(b) by 302 days.

(21) Appl. No.: 15/114,184

(22) PCT Filed: Jan. 28, 2015

(86) PCT No.: PCT/EP2015/051709
§ 371 (c)(1),
(2) Date: Jul. 26, 2016

(87) PCT Pub. No.: WO2015/114008
PCT Pub. Date: Aug. 6, 2015

(65) Prior Publication Data
US 2017/0009143 A1 Jan. 12, 2017

(30) Foreign Application Priority Data
Jan. 28, 2014 (EP) .................. 14152931

(51) Int. Cl.
*C10G 3/00* (2006.01)
*C10G 1/00* (2006.01)
(Continued)

(52) U.S. Cl.
CPC ............ *C10G 3/50* (2013.01); *C10G 1/00* (2013.01); *C10G 3/42* (2013.01); *C10G 3/44* (2013.01);
(Continued)

(58) Field of Classification Search
CPC .......... C10G 3/50; C10G 45/44; C10G 65/00
See application file for complete search history.

(56) References Cited

U.S. PATENT DOCUMENTS 5,959,167 A * 9/1999 Shabtai .................. C10G 47/12
585/242
5,961,786 A 10/1999 Freel et al.
(Continued)

FOREIGN PATENT DOCUMENTS

CA 1283880 5/1991
EP 0998975 A1 5/2000
(Continued)

OTHER PUBLICATIONS

GTI "Technical Report Refinery Upgrading of Hydropyrolysis Oil from Biomass" 2015. pp. 1-222. (Year: 2015).*
(Continued)

*Primary Examiner* — In Suk C Bullock
*Assistant Examiner* — Alyssa L Cepluch
(74) *Attorney, Agent, or Firm* — SHELL USA, INC.

(57) ABSTRACT

The present invention provides a process for producing liquid hydrocarbon products from solid biomass and/or residual waste feedstocks.

20 Claims, 6 Drawing Sheets (51) Int. Cl.
*C10G 45/44* (2006.01)
*C10G 65/00* (2006.01)

(52) U.S. Cl.
CPC .............. *C10G 45/44* (2013.01); *C10G 65/00* (2013.01); *C10G 2300/1014* (2013.01); *C10G 2300/202* (2013.01); *C10G 2400/04* (2013.01); *Y02P 30/20* (2015.11)

(56) References Cited

U.S. PATENT DOCUMENTS

| | | | |
|---|---|---|---|
| 7,994,375 B2 | 8/2011 | Marker et al. | |
| 8,217,210 B2 | 7/2012 | Agrawal et al. | |
| 8,278,492 B2 | 10/2012 | Myllyoja et al. | |
| 8,383,871 B1 | 2/2013 | Sellars et al. | |
| 8,492,600 B2* | 7/2013 | Marker | C01B 3/16 201/21 |
| 2002/0043483 A1 | 4/2002 | Leung et al. | |
| 2004/0216891 A1 | 11/2004 | Maguire | |
| 2008/0280754 A1 | 11/2008 | Toledo Antonio et al. | |
| 2008/0308457 A1 | 12/2008 | Dindi et al. | |
| 2009/0139732 A1 | 6/2009 | Garcia | |
| 2010/0251615 A1 | 10/2010 | Marker et al. | |
| 2011/0016771 A1 | 1/2011 | Crouse et al. | |
| 2011/0028211 A1 | 2/2011 | Shiga et al. | |
| 2011/0167713 A1 | 7/2011 | Quignard et al. | |
| 2011/0201854 A1 | 8/2011 | Kocal et al. | |
| 2011/0232166 A1 | 9/2011 | Kocal | |
| 2011/0282118 A1* | 11/2011 | Shih | C10G 45/58 585/254 |
| 2012/0026653 A1 | 2/2012 | Zhou | |
| 2012/0055846 A1* | 3/2012 | Domokos | B01J 29/084 208/111.35 |
| 2012/0232299 A1 | 9/2012 | Bartek et al. | |
| 2012/0260563 A1 | 10/2012 | Marker et al. | |
| 2012/0266530 A1* | 10/2012 | Ellis | C10B 53/00 44/500 |
| 2012/0317873 A1 | 12/2012 | Johnson et al. | |
| 2013/0172637 A1 | 7/2013 | Sellars et al. | |
| 2013/0305591 A1* | 11/2013 | McCall | C10G 45/58 44/300 |
| 2013/0338412 A1 | 12/2013 | Marker et al. | |
| 2014/0058182 A1 | 2/2014 | Sandstede et al. | |
| 2014/0100395 A1 | 4/2014 | Felix et al. | |
| 2014/0326641 A1* | 11/2014 | Bonduelle | B01J 37/0236 208/58 |

FOREIGN PATENT DOCUMENTS

| | | |
|---|---|---|
| EP | 1553157 | 7/2005 |
| EP | 1717411 A1 | 11/2006 |
| WO | 8801611 A1 | 3/1988 |
| WO | 199856876 | 12/1998 |
| WO | 200077129 | 12/2000 |
| WO | 0118353 A1 | 3/2001 |
| WO | 2010117437 | 10/2010 |
| WO | 2012104257 A1 | 8/2012 |
| WO | 2012162403 | 11/2012 |
| WO | 2013074434 A1 | 5/2013 |
| WO | 2013366808 | 5/2013 |
| WO | 2014001632 | 1/2014 |
| WO | 2015114008 A1 | 8/2015 |

OTHER PUBLICATIONS

Marker, et al.; "Integrated Hydropyrolysis and Hydroconversion Process for Production of Gasoline and Diesel Fuel from Biomass";Internet Citation; URL;http://s3.amazonaws.com/zanran_storage/www.aicheproceedings.org/ContentPages/2480031422.pdf; pp. 1-11; Jul. 31, 2005.
International Search Report for PCT/EP2015/051709, dated May 8, 2015; 5 pages.
International Search Report and Written Opinion Received for PCT Application No. PCT/EP2015/064749, dated Aug. 20, 2015, 09 pages.
International Search Report and Written Opinion received for PCT Patent Application No. PCT/EP2016/072763, dated Dec. 12, 2016, 11 pages.
International Search Report and Written Opinion received for PCT Patent Application No. PCT/EP2015/051709, dated May 8, 2015, 13 pages.

* cited by examiner

CONVERSION OF BIOMASS OR RESIDUAL WASTE MATERIAL TO BIOFUELS

PRIORITY CLAIM

The present application is the National Stage (§ 371) of International Application No. PCT/EP2015/051709, filed Jan. 28, 2015, which claims priority from European Application No. 14152931.3, filed Jan. 28, 2014 incorporated herein by reference.

FIELD OF THE INVENTION

The invention relates to a process for converting a biomass or residual waste material into a liquid hydrocarbon material suitable for use as a fuel or as a blending component in a fuel.

BACKGROUND OF THE INVENTION

With increasing demand for liquid transportation fuels, decreasing reserves of 'easy oil' (crude petroleum oil that can be accessed and recovered easily) and increasing constraints on carbon footprints of such fuels, it is becoming increasingly important to develop routes to produce liquid transportation fuels from biomass in an efficient manner. Such liquid transportation fuels produced from biomass are sometimes also referred to as biofuels. Biomass offers a source of renewable carbon. Therefore, when using such biofuels, it may be possible to achieve more sustainable $CO_2$ emissions over petroleum-derived fuels.

An efficient, self-contained method for processing biomass into high quality liquid fuels is described in WO 2010/117437 A1, in the name of Gas Technology Institute. Said method includes the steps of a) hydropyrolysing biomass in a hydropyrolysis reactor vessel containing molecular hydrogen and a deoxygenating catalyst, producing a mixture of light gases containing predominantly $CO_2$, $H_2O$, CO and $C_1$-$C_3$ gas, vapours containing partially deoxygenated products of hydropyrolysis, char, ash and fines of deoxygenating catalyst; b) removing said char, ash and deoxygenating catalyst fines from said light gases and vapours containing partially deoxygenated products of hydropyrolysis; c) processing the vapours containing partially deoxygenated products of hydropyrolysis in a hydroconversion reactor vessel using a hydroconversion catalyst in the presence of the $H_2O$, $CO_2$, CO and $C_1$-$C_3$ gas generated in step a), producing a substantially fully deoxygenated hydrocarbon liquid and a gaseous mixture comprising CO, $H_2O$, $CO_2$, and light hydrocarbon gases ($C_1$-$C_3$); d) steam reforming a portion of said $C_1$-$C_3$ gaseous mixture, and water-gas shifting the CO, producing molecular hydrogen; and e) introducing said molecular hydrogen into said reactor vessel for hydropyrolysing said biomass, wherein steps a) and c) are operated at conditions under which about 30-70% of oxygen in said biomass is converted to $H_2O$ and about 30-70% of said oxygen is converted to CO and $CO_2$. The reformed hydrogen may then be used in said process as the hydrogen source in step a).

The product from the process of WO 2010/117437 may then be further separated to produce diesel fuel, gasoline or blending components for gasoline and diesel fuel.

Different specifications for gasoline and diesel fuel are required in different locations. Material not meeting these specifications may be used as a blending component in a fuel or may need to be upgraded in order to be used as a blending component or as the fuel itself.

Solid feedstocks, such as feedstocks containing waste plastics and biomass feedstocks containing lignocellulose (e.g. woody biomass, agricultural residues, forestry residues, residues from the wood products and pulp & paper industries and sorted municipal solid waste containing waste plastics and/or lignocellulosic material), are important feedstocks for biomass to fuel processes due to their availability on a large scale. Lignocellulose comprises a mixture of lignin, cellulose and hemicelluloses in any proportion and usually also contains ash and moisture.

Hydrocarbon liquid products formed by hydropyrolysis and hydroconversion of lignocellulose and waste plastics-containing feedstocks may not fulfill the specifications required for diesel and gasoline range products in a number of locations. For example, such material may have undesirable distribution of various classes or hydrocarbon molecules (aromatics, paraffins and naphthenes) resulting in, for example, poor octane number of gasoline and poor cetane number of diesel product. It would, therefore, be desirable to provide an improved process for the conversion of lignocellulose-containing biomass into liquid hydrocarbon products in which said liquid hydrocarbon products meet gasoline and/or diesel specifications in one or more locations worldwide.

SUMMARY OF THE INVENTION

Accordingly, the present invention provides a process for producing liquid hydrocarbon products from solid biomass and/or residual waste feedstocks, said process comprising the steps of:
  a) hydropyrolysing the solid feedstock in a hydropyrolysis reactor vessel in the presence of molecular hydrogen and one or more deoxygenation catalyst, producing a product stream comprising partially deoxygenated hydropyrolysis product, $H_2O$, $H_2$, $CO_2$, CO, $C_1$-$C_3$ gases, char and catalyst fines;
  b) removing said char and catalyst fines from said product stream;
  c) hydroconverting said partially deoxygenated hydropyrolysis product in a hydroconversion reactor vessel in the presence of one or more hydroconversion catalyst and of the $H_2O$, $CO_2$, CO, $H_2$, and $C_1$-$C_3$ gas generated in step a), producing a vapour phase product comprising substantially fully deoxygenated hydrocarbon product, $H_2O$, CO, $CO_2$, and $C_1$-$C_3$ gases;
  d) condensing the vapour phase product of step d) to provide a liquid phase product comprising substantially fully deoxygenated C4+ hydrocarbon liquid and aqueous material and separating said liquid phase product from a gas phase product comprising $H_2$, CO, $CO_2$, and $C_1$-$C_3$ gases;
  e) removing the aqueous material from the substantially fully deoxygenated C4+ hydrocarbon liquid; and
  f) hydroprocessing at least a portion of the substantially fully deoxygenated C4+ hydrocarbon liquid in a hydroprocessing reactor vessel in the presence of hydrogen and one or more hydroprocessing catalysts each hydroprocessing catalyst comprising at least one reduced metal on a solid support, in order to provide an upgraded liquid hydrocarbon stream.

DETAILED DESCRIPTION OF THE INVENTION

The present inventors have surprisingly found that liquid hydrocarbon fuels with improved specifications can be obtained from solid feedstocks comprising biomass and/or waste plastics in an efficient process comprising subjecting said feedstocks to hydropyrolysis and hydroconversion steps, separating a liquid C4+ hydrocarbon product and subjecting at least a portion of said liquid C4+ hydrocarbon product to a hydroprocessing step in the presence of one or more catalysts comprising a reduced metal on a solid support.

In the first step of the inventive process, a solid feedstock comprising lignocellulose and/or waste plastics and molecular hydrogen are introduced into a reactor vessel containing a deoxygenation catalyst, in which vessel the biomass undergoes hydropyrolysis, producing an output comprising char, partially deoxygenated products of hydropyrolysis, light gases ($C_1$-$C_3$ gases, $H_2O$, CO, $CO_2$, and $H_2$) and catalyst fines. Although any type of reactor suitable for hydropyrolysis may be employed, the preferred type of reactor is a bubbling fluidized bed reactor. The fluidization velocity, catalyst size and bulk density and biomass size and bulk density are chosen such that the catalyst remains in the bubbling fluidized bed, while the char produced gets entrained out of the reactor. The hydropyrolysis step employs a rapid heat up of the biomass feed such that the residence time of the pyrolysis vapours in the reactor vessel is preferably less than about 1 minute, more preferably less than 30 seconds and most preferably less than 10 seconds.

The solid feedstock used in the inventive process comprises a residual waste feedstock and/or a biomass feedstock containing any combination of one or more of lignin, lignocellulosic, cellulosic and/or hemicellulosic material. Lignocellulosic material comprises a mixture of lignin, cellulose and hemicelluloses in any proportion and usually also contains ash and moisture. Such material is typically more difficult to convert into fungible liquid hydrocarbon products than cellulosic and hemicellulosic material. It is an advantage of the present process that it can be used for lignocellulose-containing biomass. Therefore, the solid biomass feedstock used in the inventive process preferably contains lignocellulosic material. Suitable lignocellulose-containing biomass includes woody biomass and agricultural and forestry products and residues (whole harvest energy crops, round wood, forest slash, bamboo, sawdust, bagasse, sugarcane tops and trash, cotton stalks, corn stover, corn cobs, castor stalks, Jatropha whole harvest, Jatropha trimmings, de-oiled cakes of palm, castor and Jatropha, coconut shells, residues derived from edible nut production and mixtures thereof, and municipal solid wastes containing lignocellulosic material. The municipal solid waste may comprise any combination of lignocellulosic material (yard trimmings, pressure-treated wood such as fence posts, plywood), discarded paper and cardboard and waste plastics, along with refractories such as glass, metal. Prior to use in the process of this invention, municipal solid waste may be optionally converted into pellet or briquette form, such pellets or briquettes are commonly referred to as Refuse Derived Fuel in the industry. Certain feedstocks (such as algae and lemna) may also contain protein and lipids in addition to lignocellulose. Residual waste feedstocks are those comprising mainly waste plastics. In a preferred embodiment of the invention, woody biomass, preferably wood, is used as the source of the biomass.

The solid feedstock utilized in the process of this invention may be provided to the hydropyrolysis reactor vessel in the form of loose biomass particles having a majority of particles preferably less than about 3.5 mm in size or in the form of a biomass/liquid slurry. However, it will be appreciated by those skilled in the art that the biomass feed may be pre-treated or otherwise processed in a manner such that larger particle sizes may be accommodated. Suitable means for introducing the biomass feed into the hydropyrolysis reactor vessel include, but are not limited to, an auger, fast-moving (greater than about 5 m/sec) stream of carrier gas (such as inert gases and $H_2$), and constant-displacement pumps, impellers, or turbine pumps. In the most preferred embodiment of the invention, a double-screw system comprising of a slow screw for metering the biomass followed by a fast screw to push the biomass into the reactor without causing torrefaction in the screw housing is used for biomass dosing. An inert gas or hydrogen flow is maintained over the fast screw to further reduce the residence time of the biomass in the fast screw housing.

The hydropyrolysis is suitably carried out in the hydropyrolysis reactor vessel at a temperature in the range of from 350° C. to 600° C. and a pressure in the range of from 0.50 MPa to 7.50 MPa. The heating rate of the biomass is preferably greater than about 100 W/m². The weight hourly space velocity (WHSV) in g(biomass)/g(catalyst)/hr for this step is suitably in the range of from 0.2 $h^{-1}$ to 10 $h^{-1}$, preferably in the range of from 0.3 $h^{-1}$ to 3 $h^{-1}$.

The hydropyrolysis step of this invention operates at a temperature hotter than is typical of conventional hydroprocessing processes familiar to those skilled in the state-of-the-art of hydrotreating and hydrocracking of petroleum-derived fractions, as a result of which the biomass is rapidly devolatilized. Thus, the step requires an active catalyst to stabilize the hydropyrolysis vapours, but not so active that it rapidly cokes.

Catalyst particles sizes, for use in a commercial reactor in the hydropyrolysis step, are preferably in the range of from 0.3 mm to 4.0 mm, more preferably in the range of from 0.6 mm to 3.0 mm, and most preferably in the range of from 1 mm to 2.4 mm.

Any deoxygenation catalyst suitable for use in the temperature range of this process may be employed in the hydropyrolysis step. Preferably, the catalyst is selected from sulfided catalysts comprising one or more metals from the group consisting of nickel, cobalt, molybdenum or tungsten supported on a metal oxide. Suitable metal combinations include sulfided NiMo, sulfided CoMo, sulfided NiW, sulfided CoW and sulfided ternary metal systems comprising any 3 metals from the family consisting of Ni, Co, Mo and W. Monometallic catalysts such as sulfided Mo, sulfided Ni and sulfided W are suitable for use as well. Most preferred metal combinations for the deoxygenation catalyst are sulfided NiMo and sulfided CoMo.

Metal oxides useful as supports for the sulfided metal catalysts include alumina, silica, titania, ceria, zirconia, as well as binary oxides such as silica-alumina, silica-titania and ceria-zirconia. Preferred supports include alumina, silica and titania. The most preferred support is alumina. The support may optionally contain recycled, regenerated and revitalized fines of spent hydrotreating catalysts (e.g. fines of CoMo on oxidic supports, NiMo on oxidic supports and fines of hydrocracking catalysts containing NiW on a mixture of oxidic carriers and zeolites).

Total metal loadings on the deoxygenation catalyst are preferably in the range of from 1.5 wt % to 35 wt % (expressed as a weight percentage of calcined catalyst in oxidic form, e.g. weight percentage of nickel (as NiO) and molybdenum (as $MoO_3$) on calcined oxidized NiMo on alumina catalyst). Additional elements such as phosphorous may be incorporated into the catalyst to improve the dispersion of the metal. Metals can be introduced on the support by impregnation or co-mulling or a combination of both techniques.

The first step of the inventive process produces a partially deoxygenated hydropyrolysis product. The term 'partially deoxygenated' is used herein to describe material in which at least 30 wt %, preferably at least 50 wt %, more preferably at least 70 wt % of the oxygen present in the original lignocelluloses-containing biomass has been removed. The extent of oxygen removal here refers to the percentage of the oxygen in the biomass feedstock, excluding that contained in the free moisture in the feedstock. This oxygen is removed in the form of $H_2O$, CO and $CO_2$ in the hydropyrolysis step. Although it is possible that nearly 100 wt % of the oxygen present in the original biomass is removed, typically at most 99 wt %, suitably at most 95 wt % will be removed in the hydropyrolysis step.

In between the hydropyrolysis and hydroconversion steps, char and catalyst fines are removed from the partially deoxygenated hydropyrolysis product. Any ash present will also be removed at this stage. The most preferred method of char and catalyst fines removal from the vapour stream is by cyclone separation.

Char may also be removed in accordance with the process of this invention by filtration from the vapour stream, or by way of filtering from a wash step—ebullated bed. Back-pulsing may be employed in removing char from filters, as long as the hydrogen used in the process of this invention sufficiently reduces the reactivity of the pyrolysis vapours and renders the char produced free-flowing. Electrostatic precipitation, inertial separation, magnetic separation, or a combination of these technologies may also be used to remove char and catalyst fines from the hot vapour stream before further hydrofinishing, cooling and condensation of the liquid product.

In accordance with one embodiment of this invention, cyclone separation followed by hot gas filtration to remove fines not removed in the cyclones may be used to remove the char. In this case, because the hydrogen has stabilized the free radicals and saturated the olefins, the dust cake caught on the filters is more easily cleaned than char removed in the hot filtration of the aerosols produced in conventional fast pyrolysis. In accordance with another embodiment of this invention, the char and catalyst fines are removed by bubbling first stage product gas through a re-circulating liquid. The re-circulated liquid used is the high boiling point portion of the finished oil from this process and is thus a fully saturated (hydrogenated), stabilized oil having a boiling point typically above 370° C. Char or catalyst fines from the first reaction stage are captured in this liquid. A portion of the liquid may be filtered to remove the fines and a portion may be re-circulated back to the first stage hydropyrolysis reactor. One advantage of using a re-circulating liquid is that it provides a way to lower the temperature of the char-laden process vapours from the first reaction stage to the temperature desired for the second reaction stage hydroconversion step while removing fine particulates of char and catalyst. Another advantage of employing liquid filtration is that the use of hot gas filtration with its attendant, well-documented problems of filter cleaning is completely avoided.

In accordance with one embodiment of this invention, cyclone separation followed by trapping the char and catalyst fines in a high-porosity solid adsorbent bed is used to remove the char and catalyst fines from the vapour stream. Examples of high-porosity solid adsorbents suitable for trapping char and catalyst fines include CatTrap® materials available from Crystaphase.

Inert graded bed materials may also be used to remove the char and catalyst fines from the vapour stream.

In accordance with another embodiment of this invention, large-size NiMo or CoMo catalysts, deployed in an ebullated bed, are used for char removal to provide further deoxygenation simultaneous with the removal of fine particulates. Particles of this catalyst should be large, preferably in the range of from 15 to 30 mm in size, thereby rendering them easily separable from the fine char carried over from the first reaction stage, which is typically less than 200 mesh (smaller than 70 micrometers).

Any ash and catalyst fines present may also be removed in the char removal step.

After removal of the char, the partially deoxygenated hydropyrolysis product together with the $H_2$, CO, $CO_2$, $H_2O$, and $C_1$-$C_3$ gases from the hydropyrolysis step are introduced into a hydroconversion reactor vessel and subjected to a hydroconversion step. The hydroconversion is suitably carried out at a temperature in the range of from 300° C. to 600° C. and a pressure in the range of from 0.50 MPa to 7.50 MPa. The weight hourly space velocity (WHSV) for this step is in the range of about $0.1\ h^{-1}$ to about $2\ h^{-1}$.

The hydroconversion catalyst used in this step is protected from Na, K, Ca, P, and other metals present in the biomass which may otherwise poison the catalyst, since these metals are predominantly removed from the biomass into char and ash in the first hydropyrolysis stage. This catalyst is protected from olefins and free radicals by the upgrading achieved in the first reaction stage step.

Any hydroconversion catalyst suitable for use in the temperature range of this process may be employed in the hydroconversion step. Preferably, the catalyst is selected from sulfided catalysts comprising one or more metals from the group consisting of nickel, cobalt, molybdenum or tungsten supported on a metal oxide. Suitable metal combinations include sulfided NiMo, sulfided CoMo, sulfided NiW, sulfided CoW and sulfided ternary metal systems comprising any three metals from the family consisting of Ni, Co, Mo and W. Catalysts such as sulfided Mo, sulfided Ni and sulfided W are suitable for use as well.

Metal oxides useful as supports for the sulfided metal catalysts include alumina, silica, titania, ceria, zirconia, as well as binary oxides such as silica-alumina, silica-titania and ceria-zirconia. Preferred supports include alumina, silica and titania. The most preferred support is alumina.

The support may optionally contain regenerated and revitalized fines of spent hydrotreating catalysts (e.g. fines of CoMo on oxidic supports, NiMo on oxidic supports and fines of hydrocracking catalysts containing NiW on a mixture of oxidic carriers and zeolites). Total metal loadings on the catalyst are preferably in the range of from 5 wt % to 35 wt % (expressed as a weight percentage of calcined catalyst in oxidic form, e.g. weight percentage of nickel (as NiO) and molybdenum (as $MoO_3$) on calcined oxidized NiMo on alumina catalyst). Additional elements such as phosphorous may be incorporated into the catalyst to improve the dispersion of the metal. Metals can be introduced on the support by impregnation or co-mulling or a combination of both techniques.

The hydroconversion catalyst used in the hydroconversion step may be, in composition, the same as or different to the deoxygenation catalyst used in the hydropyrolysis step. In one particularly preferred embodiment of the invention, the hydropyrolysis catalyst comprises sulfided CoMo on alumina support and the hydroconversion catalyst comprises sulfided NiMo on alumina support.

After the hydroconversion step, the vapour phase product of step c) is condensed to provide a liquid phase product comprising substantially fully deoxygenated C4+ hydrocarbon liquid and aqueous material. The remaining vapour phase comprises mainly $H_2$, CO, $CO_2$ and light hydrocarbon gases (typically $C_1$ to $C_3$, but this stream may also contain some $C_{4+}$ hydrocarbons) and is separated.

This remaining vapour phase may be sent to a gas clean-up system to remove $H_2S$, ammonia and trace amounts of organic sulfur-containing compounds, if present as by-products of the process. The stream containing CO, $CO_2$, $H_2$ and light hydrocarbons may then be sent to a separation, reforming and water-gas shift section of the process, wherein hydrogen is produced from the light gases and may be re-used in the process. Preferably, this process provides enough hydrogen for use in the entire process of the invention. Renewable $CO_2$ is discharged as a by-product of the process.

The liquid phase product is then separated in order to remove the aqueous material, suitably by phase separation, and to provide the substantially fully deoxygenated C4+ hydrocarbon liquid.

The term 'substantially fully deoxygenated' is used herein to describe material in which at least 90 wt %, preferably at least 95 wt %, more preferably at least 99 wt % of the oxygen present in the original lignocellulose containing biomass has been removed. The resulting hydrocarbon liquid contains less than 2 wt %, preferably less than 1 wt %, and most preferably less than 0.1 wt % oxygen.

At least a portion of the substantially fully deoxygenated C4+ hydrocarbon liquid is then subjected to a hydroprocessing step in a hydroprocessing reactor vessel in the presence of one or more catalysts each comprising at least one reduced metal on a solid support and hydrogen.

Optionally, before the hydroprocessing step, the substantially fully deoxygenated C4+ hydrocarbon liquid is subjected to distillation in order to separate the substantially fully deoxygenated C4+ hydrocarbon liquid into fractions according to ranges of the boiling points of the liquid products contained therein. A hydroprocessing step may then be applied to all or some of these fractions.

The substantially fully deoxygenated C4+ hydrocarbon liquid comprises naphtha range hydrocarbons, middle distillate range hydrocarbons and vacuum gasoil (VGO) range hydrocarbons, which can be separated by distillation. For the purpose of clarity, middle distillates here are defined as hydrocarbons or oxygenated hydrocarbons recovered by distillation between an atmospheric-equivalent initial boiling point (IBP) and a final boiling point (FBP) measured according to standard ASTM distillation methods. ASTM D86 initial boiling point of middle distillates may vary from 150° C. to 220° C. Final boiling point of middle distillates, according to ASTM D86 distillation, may vary from 350° C. to 380° C. Naphtha is defined as hydrocarbons or oxygenated hydrocarbons having four or more carbon atoms and having an atmospheric-equivalent final boiling point that is greater than 90° C. but less than 200° C. A small amount of hydrocarbons produced in the process (typically less than 3 wt % of total C4+ hydrocarbons, and preferably less than 1 wt % of total C4+ hydrocarbons) boil at temperatures higher than those for the middle distillates as defined above, i.e. they are hydrocarbons with boiling range similar to vacuum-gas oil produced by distillation of petroleum.

Gasoline is an automotive fuel comprising predominantly of naphtha-range hydrocarbons, used in spark-ignition internal combustion engines. In the United States, ASTM D4814 standard establishes the requirements of gasoline for ground vehicles with spark-ignition internal combustion engines.

Diesel is an automotive fuel comprising predominantly of middle-distillate range hydrocarbons, used in compression-ignition internal combustion engines. In the United States, ASTM D975 standard covers the requirements of several grades of diesel fuel suitable for various types of diesel engines.

An advantage of the present invention is that under suitable operating conditions, the substantially fully deoxygenated C4+ hydrocarbon liquid produced from lignocellulose-containing biomass is substantially fully free from oxygen, sulfur and nitrogen. Preferably, the oxygen content of this product is less than 1.50 wt % and more preferably less than 0.50 wt %, and most preferably less than 0.10 wt %. The sulfur content is preferably less than 100 ppmw, more preferably less than 10 ppmw, and most preferably less than 5 ppmw. The nitrogen content is preferably less than 1000 ppmw, more preferably to less than 100 ppmw and most preferably to less than 10 ppmw.

The hydroprocessing step is carried out on at least a portion of the substantially fully deoxygenated C4+ hydrocarbon liquid. This portion may comprise the entire range of material within the substantially fully deoxygenated C4+ hydrocarbon liquid separated from the aqueous material, or may comprise one or more of the fractions separated out of the substantially fully deoxygenated C4+ hydrocarbon liquid by distillation. Alternatively, more than one fraction separated out of the substantially fully deoxygenated C4+ hydrocarbon liquid by distillation may be subjected to a hydroprocessing step separately or after re-combination of two or more of the fractions. For example, after distillation, the naphtha range fraction of hydrocarbons and/or the middle distillate range fraction of hydrocarbons may be subjected to the hydroprocessing step. Alternatively, the hydroprocessing step may be applied to at least a portion of the entire substantially fully deoxygenated C4+ hydrocarbon liquid before it is subjected to distillation.

Further, also alternatively, the hydroprocessing step may be applied to one or more of the fractions separated out of the substantially fully deoxygenated C4+ hydrocarbon liquid by distillation, with the fraction subjected to hydroprocessing then combined with one or more other fractions.

After combining the fractions or after hydroprocessing of combined fractions, the combined mixture may then be subjected to one or more further distillation steps.

For example, a benzene-rich fraction of C4+ hydrocarbon liquid may be combined with middle distillate range fraction of C4+ hydrocarbon liquid. The combined fraction may be subjected to hydroprocessing. After hydroprocessing, the combined product may be subjected to one or more distillations and blended in a suitable manner with fractions of C4+ hydrocarbon liquid that are not subjected to hydroprocessing to produce gasoline and diesel product that meet specifications for gasoline and/or diesel in one or more locations in the world.

As discussed above, the hydroprocessing step may be beneficial for upgrading, as a feed to this step, all or at least a portion (e.g., a middle distillate range fraction) of the substantially fully deoxygenated C4+ hydrocarbon liquid. This step may be used to beneficially provide an upgraded (hydrogenated) product having, relative to the feed, (i) a reduced total aromatics content, (ii) a reduced benzene content (e.g., as a result of selective saturation), (iii) a reduced sulphur and/or nitrogen content, (iv) an increased cetane number for the diesel fraction of upgraded product, (v) a reduced density, (vi) an increased octane number for the gasoline fraction of upgraded product or any combination of (i)-(vi).

In representative embodiments, for example, the upgraded product obtained from the hydroprocessing step may be reduced in total aromatics content, and/or benzene, relative to the feed, (i.e., the hydroprocessing step may achieve a total aromatics conversion level, and/or a benzene conversion level) of generally at least about 40% (e.g., from about 40% to about 99%), typically at least about 50% (e.g., from about 50% to about 99%), and often at least about 60% (e.g., from about 60% to about 99%). Such total aromatics conversion levels, and/or benzene conversion levels may be achieved with representative feeds having a total, starting aromatics content of at least about 40%, at least about 70%, or at least about 80%, by weight.

While representative feeds to the hydroprocessing step may have these contents of total aromatics by weight, or, according to alternative embodiments, these levels of total benzene by weight, regardless of the aromatics conversion level achieved, such feeds may also, or alternatively, have relatively a low total sulphur content, particularly when compared to diesel boiling range hydrocarbon fractions obtained from conventional refining processes (e.g., crude oil fractionation), prior to final upgrading. Low sulphur levels in the feed can be a result of the low sulphur content of the starting biomass and/or a result of upstream processing steps, described above (e.g., hydroconversion), which can serve to reduce the level of sulphur present in the substantially fully deoxygenated C4+ hydrocarbon liquid. Representative feeds may have a total sulphur content, for example, of generally less than about 100 parts per million by weight (wt-ppm), typically less than about 50 wt-ppm, and often less than about 10 wt-ppm. Representative feeds may, in combination with the contents of total aromatics, total benzene, and/or total sulphur described above, or may alternatively, have a total nitrogen content of generally less than about 500 wt-ppm, typically less than 200 wt-ppm, and often less than about 100 wt-ppm. Representative conversion levels of total sulphur and/or total nitrogen in the hydroprocessing step may be at least about 50%, at least about 65%, or at least about 85%.

In further representative embodiments, the upgraded product may have a cetane number that is increased by at least about 5, at least about 7, or at least about 8, relative to the feed. Accordingly, the upgraded product may be ignitable in a compression ignition internal combustion engine, whereas the feed may not have this desired property.

In other representative embodiments, the upgraded product may have an octane number that is increased by at least 1.5, at least about 3, or at least about 4 units relative to the feed.

In other representative embodiments, the upgraded product may have a density that is reduced by at least about 0.02 g/ml, at least about 0.04 g/ml, or at least about 0.05 g/ml, relative to the feed. Further properties of the upgraded product include compliance with regulatory standards for gasoline and diesel fuel products, including diesel fuel aromatics content and sulphur standards in Europe and North America (e.g., compliance with the aromatic specification of ASTM D975 No. 1 and No. 2 diesel in North America).

The hydroprocessing reactor contains one or more catalysts each in the form of at least one reduced metal supported on a solid support. 'Reduced metal' as used herein refers to its normal meaning: that the metal is in a zero oxidation state.

In an embodiment of the invention, preferable metals present on at least one of the one or more catalysts include nickel, platinum, palladium and ruthenium or a combination of one or more of these metals. The metal loading for nickel containing catalysts preferably varies from 1 wt % to 70 wt % expressed as a percentage of calcined, oxidic catalyst. For noble-metal containing catalysts (platinum, palladium, ruthenium, rhodium), the loading preferably varies from 0.05 wt % to 3 wt % expressed as a percentage of calcined, oxidic catalyst. Suitable supports in this embodiment include metal oxides such as silica, alumina, mixed silica-alumina, titania, ceria, zirconia and mixed ceria-zirconia, activated carbon and mesoporous carbon. Such catalysts have the advantageous property of promoting nearly 100% saturation of aromatics in the feed without causing a significant shift in the boiling range of the hydrocarbon liquid treated. Preferably, the amount of hydrocarbon liquid that is converted from diesel range to gasoline range is less than 10 wt %.

In an embodiment of the invention, preferable metals present on at least one of the one or more catalysts include nickel, platinum, palladium, ruthenium and rhodium or a combination of one or more of these metals. The metal loading for nickel containing catalysts preferably varies from 1 wt % to 70 wt % expressed as a percentage of calcined, oxidic catalyst. For noble-metal containing catalysts (platinum, palladium, rhodium and ruthenium), the loading preferably varies from 0.05 wt % to 3 wt % expressed as a percentage of calcined, oxidic catalyst. Suitable solid oxide supports in this embodiment include metal oxides or mixtures thereof with higher levels of acidity. Such supports include amorphous silica-alumina, zeolites and combinations thereof with other oxides such as silica, alumina, titania, ceria and zirconia or with activated carbon or mesoporous carbon. ASA carriers may be modified with base metals such as boron, lithium, bismuth, magnesium, zinc, zirconium or with phosphorus. Such catalysts have the advantageous property of promoting saturation of aromatics in the feed and of promoting hydrocracking of heavier hydrocarbons in the feed.

In an embodiment of the invention, preferable metals present on at least one of the one or more catalysts are selected from systems containing nickel, platinum, palladium, iridium, ruthenium and rhodium. Bimetallic systems, for example PtIr, PdIr, NiIr supported on metal oxides and carbons may be used as well. The metal loading for nickel containing catalysts preferably varies from 1 wt % to 70 wt % expressed as a percentage of calcined, oxidic catalyst. For noble-metal containing catalysts (platinum, palladium, iridium, ruthenium and rhodium), the total metal loading preferably varies from 0.05 wt % to 3 wt % expressed as a percentage of calcined, oxidic catalyst. Suitable supports include metal oxides such as silica, alumina, titania, supports with mild basicity such as ceria, zirconia, mixed ceria-zirconia, magnesia, cupric oxide, hydrotalcites and spinels, mildly acidic materials such as amorphous silica-alumina (ASA) and zeolites with high $SiO_2:Al_2O_3$ ratio (>20). ASA carriers may be modified with base metals such as boron, lithium, bismuth, magnesium, zinc, zirconium or with phosphorus. Such catalysts have the advantageous property of promoting saturation of aromatics in the feed and of opening naphthenic or aromatic ring of cyclic molecules in the feed.

Optionally, catalysts from more than one of the 3 previously described embodiments (i.e. catalysts that are (i) catalysts that are particularly suitable wherein high amounts of aromatic saturation are required; (ii) catalysts that are particularly suitable wherein mild hydrocracking is required; and (iii) catalysts that are particularly suitable wherein high amounts of ring opening are required) are used in the hydroprocessing step. When more than one catalyst is used, these may be present in a mixed catalyst bed, as a stacked catalyst bed or within different reactor vessels within the hydroprocessing reactor system. It is also envisaged that a single catalyst may be used which acts in more than one of these mechanisms (aromatic saturation, mild hydrocracking and ring opening).

Reduced metal hydroprocessing catalysts as described above are sensitive to sulphur. Therefore, optionally a sulphur guard bed may be present before the hydroprocessing catalyst in the hydroprocessing reactor vessel. In this embodiment of the invention, materials suitable as a sulfur guard bed include highly dispersed metals or metal oxides on an oxidic support. Examples of oxidic support include silica, alumina, and mixed silica-alumina. Suitable metals dispersed on oxidic support include nickel, iron, and copper. Suitable metal oxides dispersed on oxidic support include ferric oxide, zinc oxide and cupric oxide. Suitable loadings of active metal or metal oxide on the support range from 2 wt % to 70 wt % based on calcined, oxidic form of the trap material.

In a further embodiment of the invention, the material used as the sulphur guard bed may be the same material as the hydroprocessing catalyst. In this embodiment, the sulphur guard bed material may be present as a separate bed or as a sacrificial portion of the hydrogenation catalyst bed. A separate bed of sulphur guard bed material or sacrificial hydrogenation catalyst may be used in a separate reactor that is easily removed from service once it becomes spent (e.g., sulphur breakthrough is detected) or almost spent, allowing a fresh bed to be placed in service simultaneously with, or shortly after, removal of the spent or almost spent bed from service. A swing-bed system with appropriate valve and piping connections may be suitable for this objective.

Alternatively, a separate reactor containing a hydrodesulfurisation (HDS) catalyst may be used and the feed to the hydroprocessing reactor may be provided to the HDS reactor prior to being subjected to hydroprocessing. Suitable HDS reactors and catalysts are known in the art and include sulfided NiMo or sulfided CoMo on oxidic support. Examples of oxidic supports include alumina, silica, titania, silica-alumina. Preferred catalyst for hydrodesulfurisation of the feed is a sulfided CoMo supported on alumina support.

In one exemplary embodiment, a stacked bed hydroprocessing reactor may be used in which at least a portion of the substantially fully deoxygenated C4+ hydrocarbon liquid is contacted with a sulphur guard bed and then one or more hydroprocessing catalysts in turn.

The hydroprocessing step, including the sulphur guard bed, if present, is suitably carried out in the reactor vessel at a temperature in the range of from 100° C. to 450° C. and a pressure in the range of from 0.3 MPa to 15.1 MPa. The weight hourly space velocity (WHSV) in g(feed)/g(catalyst)/hr for this step is suitably in the range of from 0.1 $h^{-1}$ to 2.5 $h^{-1}$.

Hydroprocessing reactions are exothermic, and as is known to those skilled in the state of the art, require quench to avoid generation of excessive temperatures in the reactor. Such excessive temperatures are undesirable, as they inhibit aromatic saturation reactions, and promote coking. Further, excessive temperature may damage the catalyst and cause its deactivation. As those skilled in the art will recognize, either a liquid quench using recycled product liquid combined with fresh feed, or a gas quench using hydrogen injection at one or more locations in the hydroprocessing bed, or a combination of both strategies, may be employed to manage the exotherm. When a liquid quench is used, the weight hourly space velocity above is calculated on the basis of fresh feed alone.

DETAILED DESCRIPTION OF THE DRAWINGS

Figure 1:
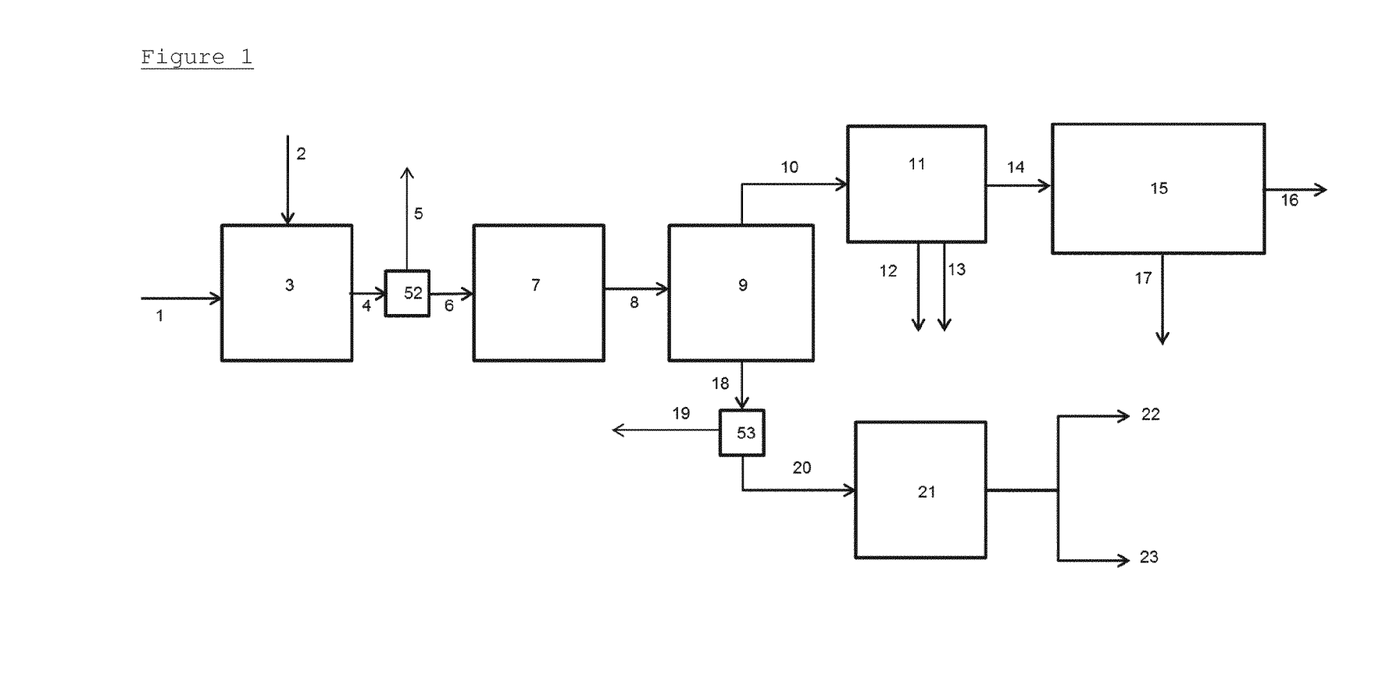
FIG. 1 shows a representation of one embodiment of the prior art disclosure of WO 2010/117437.

FIG. 1 shows an embodiment of the prior art process described in WO 2010/117437 A1.

Feedstock containing the lignocellulosic material 1 is contacted with a hydrogen-containing gaseous stream 2 in hydropyrolysis reactor 3 containing hydropyrolysis catalyst. This reactor is a bubbling fluidized bed reactor. The product 4 of this reactor is a mixed solid and vapour phase product containing hydrogen, light gases ($C_1$-$C_3$ hydrocarbons, CO, $CO_2$, $H_2S$, ammonia, water vapour), vapours of C4+ hydrocarbons and oxygenated hydrocarbons. Char, ash and catalyst fines are entrained with the vapour phase product. A solid separator 52 separates char, ash and catalyst fines 5 from the vapour phase product 6. The vapour phase product 6 then enters the catalytic hydroconversion reactor 7. This reactor is a fixed bed reactor. The product 8 of this reactor contains light gaseous hydrocarbons (methane, ethane, ethylene, propane, and propylene), naphtha range hydrocarbons, middle-distillate range hydrocarbons, hydrocarbons boiling above 370° C. (based on ASTM D86), hydrogen and by-products of the upgrading reaction such as $H_2O$, $H_2S$, $NH_3$, CO and $CO_2$. The vapours are condensed in one or more condensers followed by gas-liquid separators 9 downstream of the catalytic hydroconversion reactor 7 and a liquid product 18 is recovered. The non-condensable gases 10 are sent to a gas clean-up system 11, comprising one or more process units, to remove a $H_2S$ stream 12 and ammonia stream 13 as by-products of the process. Organic sulfur containing compounds may be removed in the gas clean-up system as well. The stream containing light hydrocarbons 14 is sent to a separation, reforming and water-gas shift section 15 of the process, where hydrogen 16 is produced from the light gases and renewable $CO_2$ is discharged as a by-product of the process 17. A fuel gas stream may be recovered as a by-product from this section as well. The hydrogen 16 produced in section 15 of the process may be recycled to the hydropyrolysis reactor 3. The quantity of hydrogen stream 16 produced in section 15 is equal to or greater than the hydrogen required to maintain fluidisation and sustain chemical consumption of hydrogen in the process.

The liquid product 18 recovered from the condensation and gas-liquid separation system 9 are sent to a product recovery section 53, where the aqueous product 19 is separated from the hydrocarbon liquid product 20. The hydrocarbon liquid product 20 is then sent for distillation 21 to recover gasoline product 22 and a middle-distillate product 23. If desired, kerosene/jet fuel and diesel may be recovered as separate streams from the distillation tower.

Figure 2:
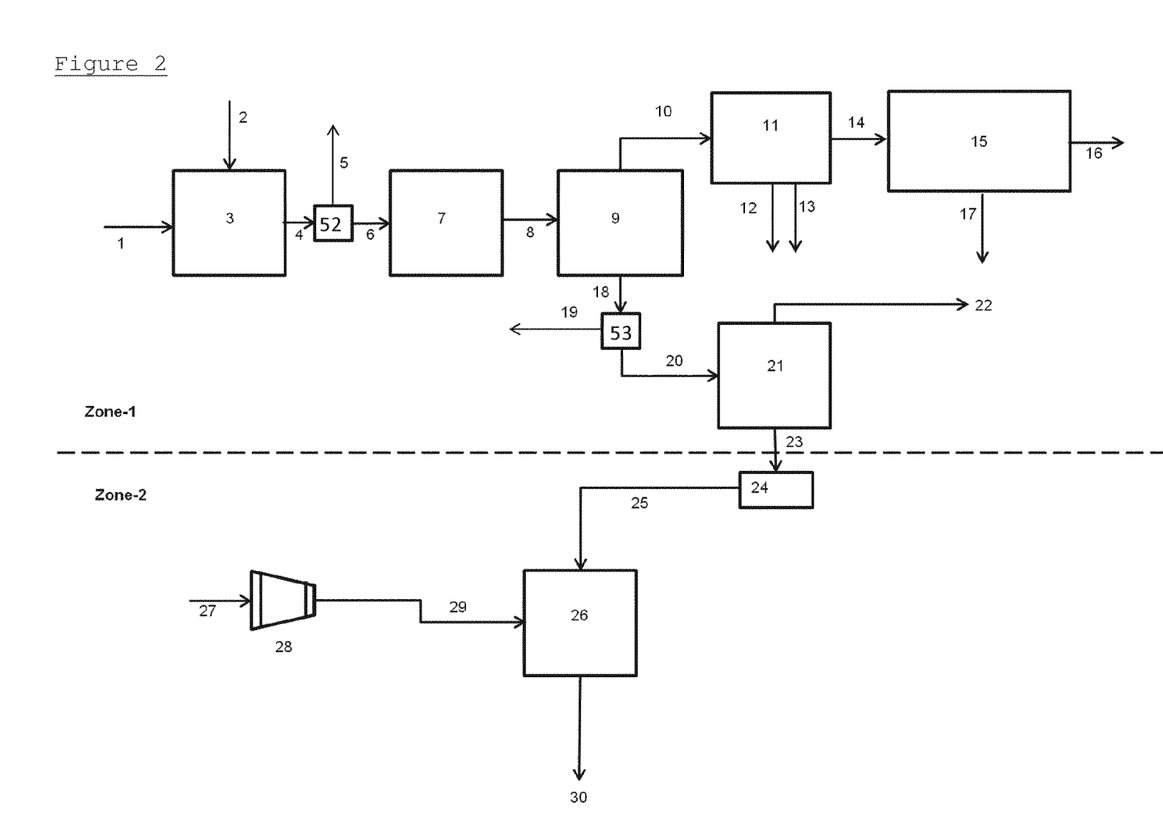
FIGS. 2 to 6 show representations of non-limiting embodiments of the process of the invention.

FIG. 2 exemplifies one embodiment of the invention described herein. The embodiment shown in FIG. 2 includes the same steps as the embodiment of the prior art shown in FIG. 1, shown in zone 1 of FIG. 2.

However, an additional fixed-bed hydrogenation reactor 26 for upgrading the middle distillate fraction 23 recovered by the distillation 21 of the hydrocarbon product 20 of the hydroconversion reactor 7. A pump 24 is used to provide this stream 25 to the reactor. A stream of hydrogen 27 is compressed in a compressor 28 in order to provide a hydrogen stream 29 at a pressure that is similar to or higher than the pressure at which the reactors (3, 7) in zone 1 operate. The middle distillate fraction is pumped into the reactor 26 and processed over a hydrogenation (or hydrogenation & ring opening) catalyst system to produce an upgraded product stream 30.

The product of the additional fixed bed reactor suitably has improved attributes of quality of lower aromatic content, lower density, higher hydrogen content, and higher cetane number, when compared to the middle distillate fraction 23. A gas stream separated from this liquid product may be recycled to the hydrogenation reactor or sent to the gas clean-up system.

Figure 3:
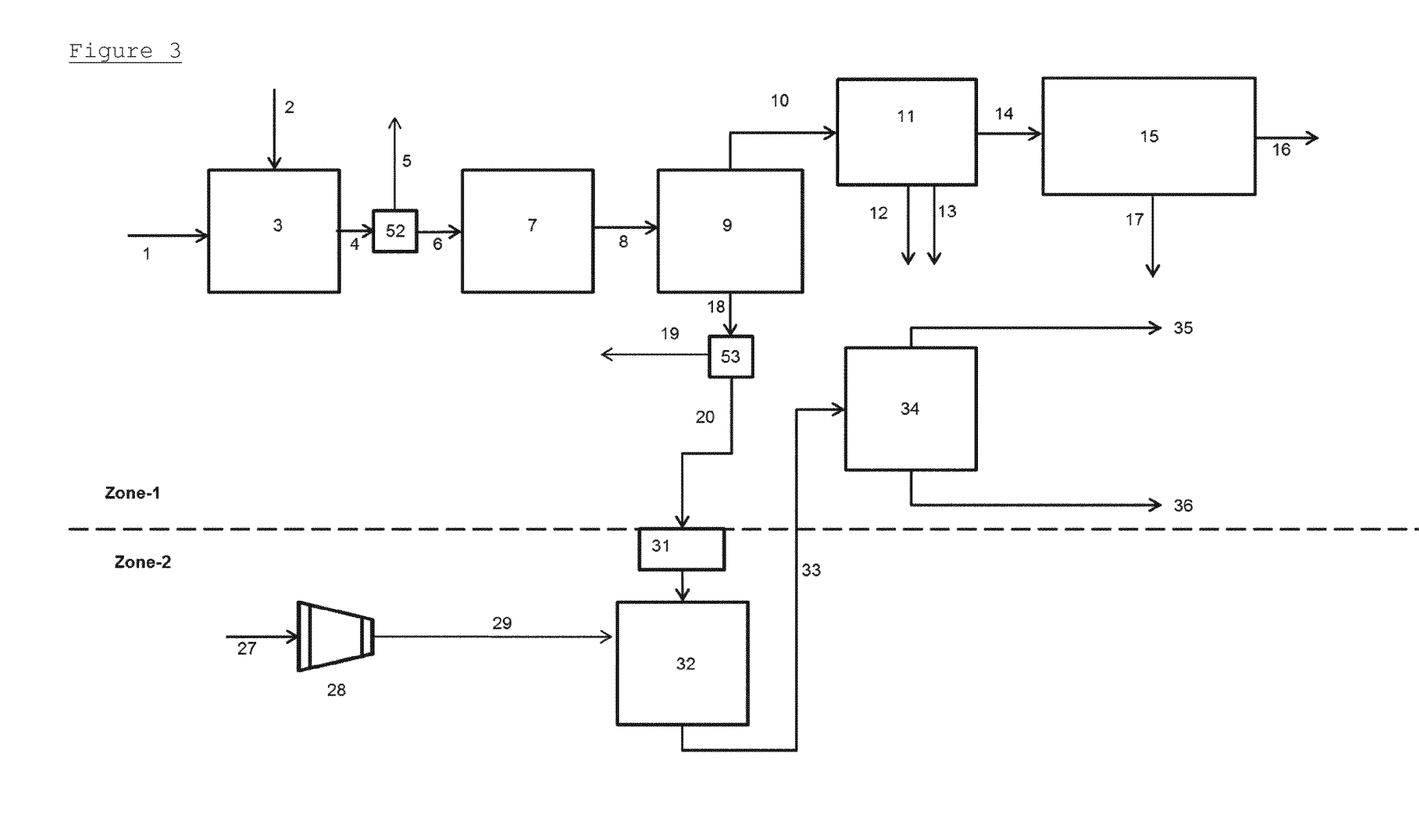

A further embodiment of the invention is shown in FIG. 3. Again a process similar to that shown in FIG. 1 is followed. However, the hydrocarbon liquid product 20 is in this embodiment not fed to a distillation set-up, but is instead is passed via a pump 31 to the hydroprocessing reactor 32 where it is contacted with a pressurised hydrogen feed 29. The product 33 of the fixed-bed hydroprocessing reactor 32 is then sent for distillation 34 to recover a gasoline product 35 and a middle distillate product 36.

This embodiment of the invention has the added advantage that the gasoline fraction may also be subjected to upgrading, e.g. to reduce benzene to meet regulatory specifications, before distillation.

Figure 4:
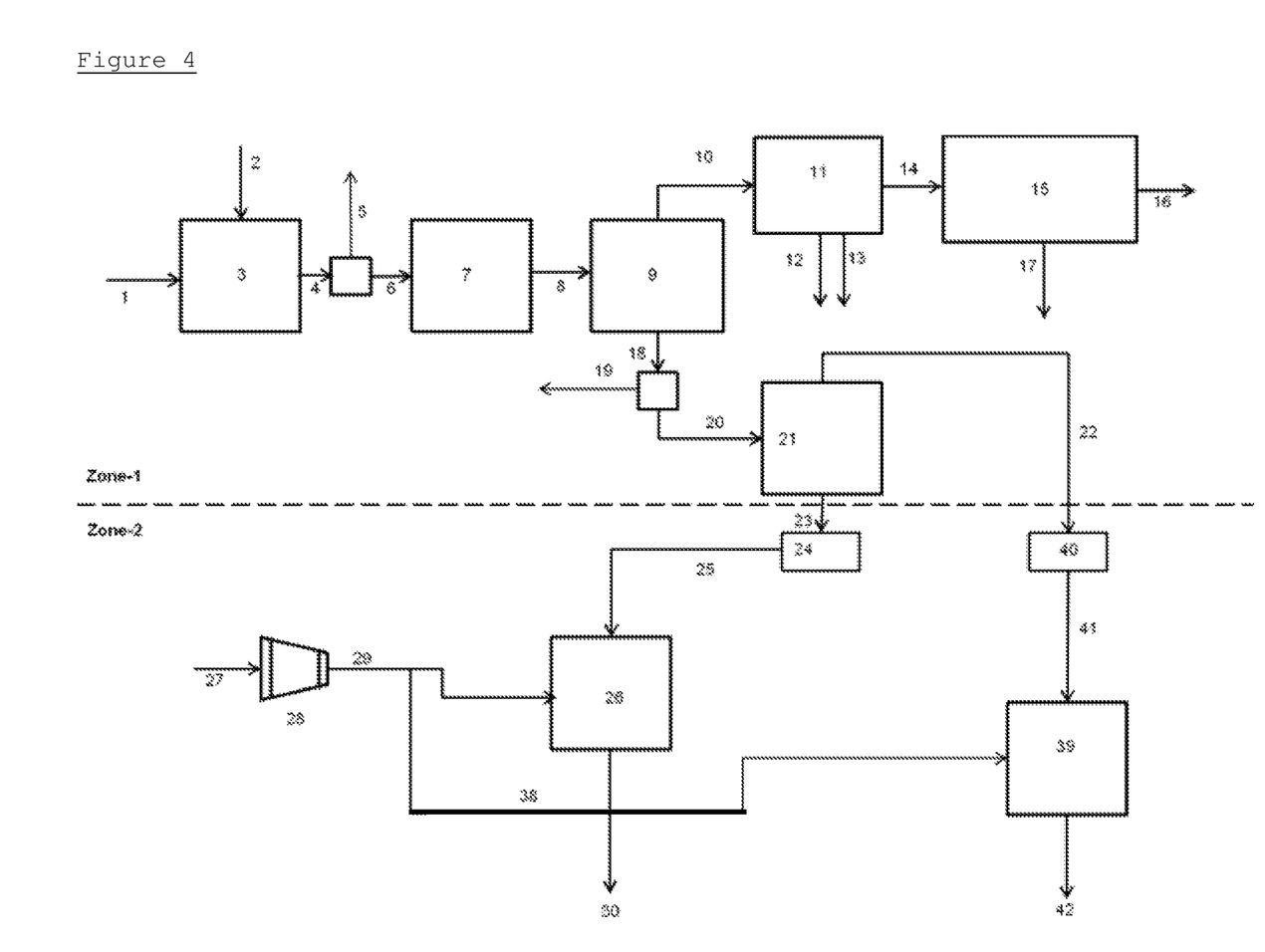

Another embodiment of the invention is shown in FIG. 4. In this embodiment, the middle distillate fraction is processed in the same manner as in FIG. 2. However, following distillation, the gasoline fraction 22 is also passed through a pump 40 and supplied 41 to a further hydroprocessing reactor 39 where it is reacted with a hydrogen stream 38 in the presence of a catalyst to provide upgraded gasoline stream 42. In this embodiment, compressor 28 may represent one compressor or two or more compressors in series or in parallel.

Figure 5:
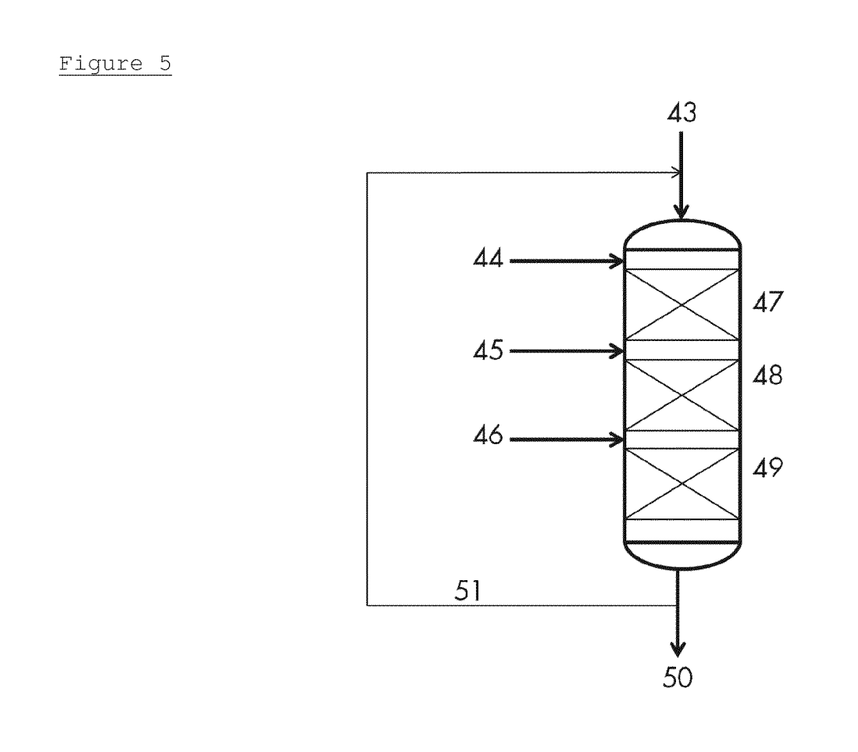

FIG. 5 shows an example of one embodiment of a hydroprocessing reactor for use in the present invention. In this embodiment, the reactor contains a number of catalyst beds. The top bed 47 contains a sulfur guard bed, which traps at least a portion of any sulfur left in the hydrocarbon product 43 of the previous reactors and protects the catalysts in the lower beds against sulfur induced deactivation. The ratio of the volume of the sulfur trap to the total reactor volume is dependent on the feed sulfur content and LHSV based on the total reactor volume.

Below the sulfur trap, the reactor contains one or more beds 48 of hydroprocessing catalyst with an optional interstage hydrogen injection 44, 45 and 46 as quench.

The locations of the hydrogen quenches shown in FIG. 5 are indicative. The hydrogenation catalyst 48 saturates aromatics present to form naphthenes. Below the hydrogenation catalyst, one or more beds 49 of a ring opening catalyst are optionally present. This catalyst, in addition to continuing aromatic saturation reactions initiated in hydrogenation catalyst bed, opens the naphthenic and aromatic rings to produce alkyl substituted naphthenes, alkyl substituted aromatics, n-paraffins and isoparaffins. The ring opening catalyst further boosts the cetane number of the middle distillate product. The hydroprocessing reactor of FIG. 5 produces upgraded product stream 50.

An optional liquid quench 51 using recycled product liquid is also shown in FIG. 5.

When using a reactor of the type shown in FIG. 5, the catalyst systems used in such a reactor affect hydrogenation of the aromatics in the feed, ring-opening of the naphthenic molecules and removal of any residual sulfur in the feed. The advantage of the process shown in FIG. 4 over that shown in FIG. 3 is the ability to independently tune the extent of hydrogenation for diesel and gasoline fractions, by allowing for an independent selection of catalyst, and operating conditions of weight hourly space velocity, temperature and pressure for upgrading of diesel and gasoline fractions. Since aromatics are beneficial in the gasoline pool due to the higher octane numbers they offer, gasoline upgrading reactor 39 may be operated at lower process severity than middle distillate upgrading reactor 26 to retain octane-boosting aromatics in the final product while saturating benzene to meet the legislative norms and removing sulfur to meet copper strip corrosion rating.

When using a reactor set up as shown in FIG. 5 as a hydroprocessing reactor, the ratio of the volume of sulfur guard bed used to the combined volume of hydrogenation (ASAT) catalyst and ring-opening (RO) catalysts suitably varies in the range of from 0:100 to 40:60. For a fixed volume of sulfur guard bed, the ratio of volume of hydrogenation (ASAT) catalyst to the volume of ring-opening (RO) catalyst suitably varies in the range of from 100:0 to 30:70. Thus, when 0% of the total volume of catalyst loaded is sulfur trap, the volume ratios of sulfur trap:ASAT catalyst: RO catalyst can vary from 0:100:0 on one extreme, to 0:30:70 on the other extreme. Similarly, when 40% of the total catalyst loaded is sulfur trap, the volume ratios of sulfur trap:ASAT catalyst:RO catalyst can vary from 40:60:0 to 40:24:36.

In the process illustrated in FIG. 4, the ratio of the volume of sulfur trap used to the combined volume of ASAT and RO catalysts in the hydroprocessing reactor 39 used to treat the naphtha range fraction varies from 0:100 to 80:20. For a fixed volume of sulfur trap, the ratio of volume of ASAT catalyst to the volume of RO catalyst varies from 100:0 to 40:60. Thus, for example, when 0% of the total volume of catalyst loaded is sulfur trap, the volume ratios of sulfur trap:ASAT catalyst:RO catalyst can vary from 0:100:0 on one extreme, to 0:80:20 on the other extreme. Similarly, when 80% of the total catalyst loaded is sulfur trap, the volume ratios of sulfur trap:ASAT catalyst:RO catalyst can vary from 80:20:0 on one extreme, to 80:14:6 on the other extreme.

Figure 6:
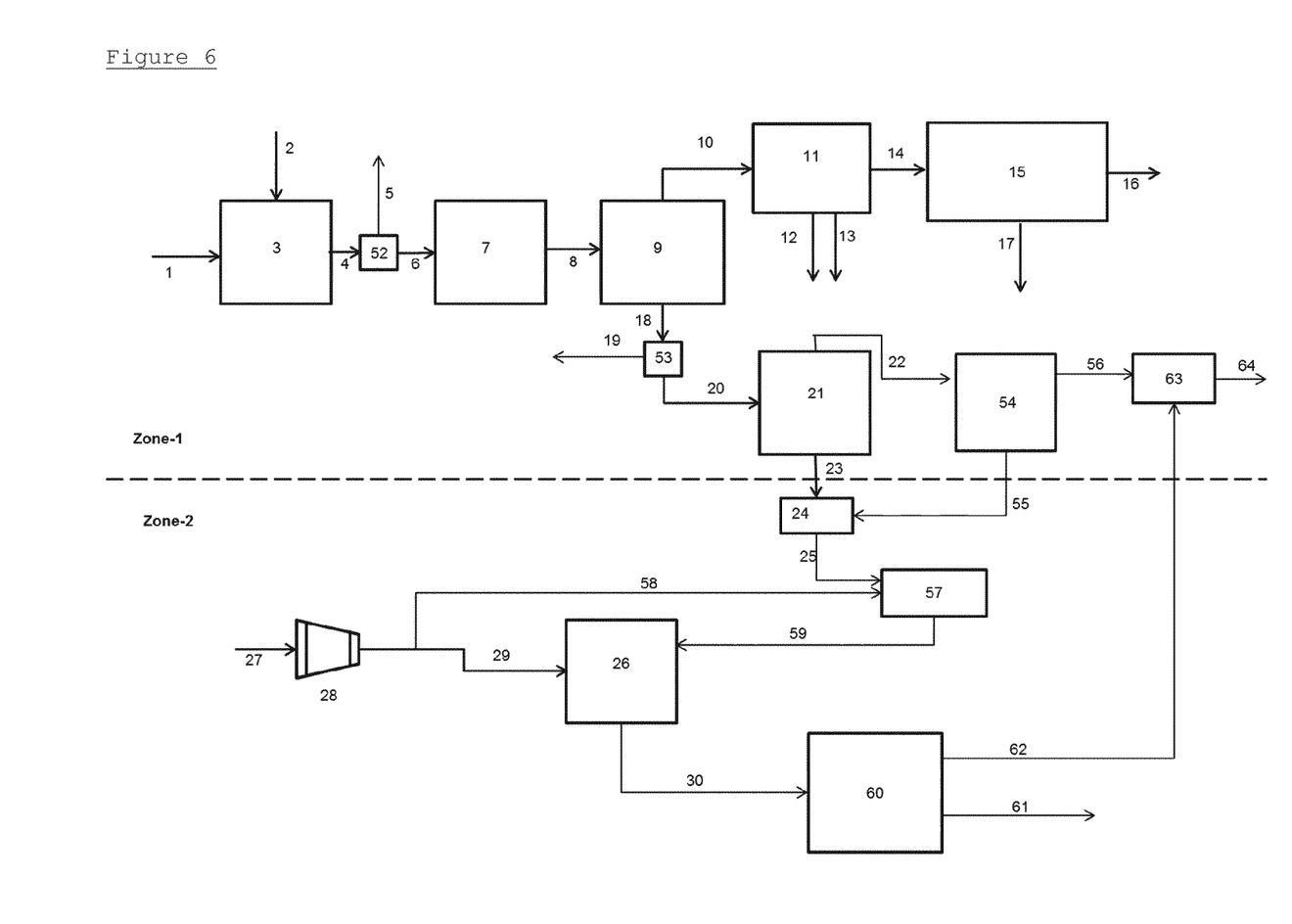

FIG. 6 exemplifies one embodiment of the invention described herein. The embodiment shown in FIG. 6 includes the same steps as the embodiment of the prior art shown in FIG. 1, shown in zone 1 of FIG. 6.

In this embodiment, the gasoline product 22, is subjected to a further distillation 54, to produce a benzene rich gasoline stream 55 and a benzene lean gasoline stream 56.

Further, an additional fixed-bed hydroprocessing reactor 26 is used for upgrading the middle distillate fraction 23 recovered by the distillation 21 of the hydrocarbon product 20 of the hydroconversion reactor 7. This fraction 23, is combined with the benzene rich gasoline stream 55 and a pump 24 is used to provide the combined stream 25 to a hydrodesulfurisation reactor 57. A stream of hydrogen 27 is compressed in a compressor 28 in order to provide hydrogen streams 29 and 58 at a pressure that is similar to or higher than the pressure at which the reactors (3, 7) in zone 1 operate. The hydrodesulfurised stream 59 is provided to hydroprocessing reactor 26 and processed over a hydroprocessing catalyst system to produce an upgraded product stream 30.

The upgraded product stream 30 may then be subjected to distillation 60 to provide an upgraded middle distillate fraction 61 and an upgraded gasoline fraction 62. The upgraded gasoline fraction 62 may then be recombined in blender 63 with the benzene lean gasoline stream 56, to provide a combined gasoline fraction 64.

The middle distillate product 61 of the additional fixed bed reactor suitably has improved attributes of quality of lower aromatic content, lower density, higher hydrogen content, and higher cetane number, when compared to the middle distillate fraction 23. A gas stream separated from this liquid product may be recycled to the hydroprocessing reactor or sent to the gas clean-up system.

The invention will now be illustrated by means of the following Examples, which are not intended to limit the invention.

EXAMPLE 1 (COMPARATIVE)

This Example was carried out according to the process illustrated in FIG. 1.

A cobalt/molybdenum catalyst based on an alumina support was sulfided. The sulfided catalyst was ground and sieved to a particle size range of 500 μm-850 μm. This catalyst was used as the $1^{st}$ upgrading catalyst in a bubbling fluidized bed reactor 3. A nickel/molybdenum catalyst on an alumina support was sulfided. The dried sulfided catalyst, in the form of extrudates of 1.3 mm diameter and approximately 3-6 mm length, was used as the $2^{nd}$ upgrading catalyst in the second, fixed bed reactor 7.

The solid feedstock used was soft wood ground and sieved to a particle size of 0 mm-1.4 mm. The catalyst in the first bubbling fluidized reactor 3 was fluidized with a stream of hydrogen pre-heated to a temperature of approximately 435° C. After the first stage catalyst had been fluidized, the biomass was introduced into the reactor and processed in a continuous manner. The weight hourly space velocity of the biomass feedstock to the $1^{st}$ stage reactor was approximately 2.5 kg biomass/kg catalyst/hour. Average temperature of the fluidized bed of catalyst was approximately 422° C. The biomass feedstock was converted to a mixture of char, ash and vapours in the $1^{st}$ stage. The fluidization velocity was adjusted in such a way that this solid and vapour phase product was carried out of the reactor while the catalyst remained in the reactor. Some catalyst was attrited into fines, and the fines were carried out of the bed as well.

The solid product was separated from the vapour phase product in a filter and the vapours were sent to the $2^{nd}$ stage, fixed bed reactor. The average temperature of the $2^{nd}$ stage catalyst was maintained at 353° C., and average WHSV based on the biomass feedstock was 0.36 kg biomass per kg catalyst per hour. Operating pressure for both $1^{st}$ and $2^{nd}$ stage was 23 barg.

The vapour phase product of $2^{nd}$ stage reactor was cooled in stages to −57° C. and a two-layer liquid product containing a hydrocarbon layer floating on an aqueous layer was recovered. The hydrocarbon liquid was separated from the aqueous liquid, and was distilled according to ASTM D2892 distillation method. Three fractions were collected and analyzed: a naphtha-range fraction boiling below 150° C., a light middle distillate fraction boiling between 150° C. and 180° C. and a heavy middle distillate fraction boiling above 180° C. The elemental analysis of the fractions is given in Table 1. The aromatic content measured in accordance with IP-391 method and density of the fraction is given in Table 2. As seen from Table 1 and Table 2, the naphtha fraction of the hydrocarbon product of $2^{nd}$ stage reactor is ultra-low sulfur, low-nitrogen product. The middle distillate fractions are low-sulfur, low-nitrogen product rich in aromatics and have a high density.

TABLE 1

| Fraction | Boiling range | Carbon [wt %] | Hydrogen [wt %] | Sulfur [ppmw] | Nitrogen [ppmw] |
|---|---|---|---|---|---|
| Naphtha | Below 150° C. | 86.0 | 14.0 | 15 | 57 |
| Light middle distillate | 150° C.- 180° C. | 88.5 | 11.5 | 27 | 100 |
| Heavy middle distillate | Above 180° C. | 89.8 | 10.2 | 30 | 170 |

TABLE 2

| Fraction | Boiling range | Mono- aromatics [wt %] | Di- aromatics [wt %] | Tri+ aromatics [wt %] | Density at 15° C. [g/mL] |
|---|---|---|---|---|---|
| Naphtha | Below 150° C. | 12.4 | BDL | BDL | 0.737 |
| Light middle distillate | 150° C.- 180° C. | 61.3 | BDL | 0.2 | 0.851 |
| Heavy middle distillate | Above 180° C. | 67.4 | 15.8 | 6.6 | 0.936 |

BDL = below detection limits

The cetane index calculated in accordance with ASTM D4737 for the combined middle distillate product (boiling range above 150° C.) is 27. When tested in compression ignition internal combustion engine, this product was found to be non-ignitable due to its high aromatic content.

EXAMPLE 2

Of the Invention

This Example was carried out according to the process illustrated in FIG. 2.

The fractionated combined middle distillate product of Example-1, having a total aromatic content of approximately 83 wt % (measured in accordance with IP-391 method) and a density of 0.9251 g/mL at 15° C., was used as feed to reactor 26 in FIG. 2. The catalyst used was a bulk nickel catalyst, commercially available from CRI Catalyst Co under the trade name KL-6515. The nickel on the catalyst was reduced to metallic form before the introduction of the feed.

The feed was processed over KL-6515 at a temperature of 240° C. and a pressure of 25 barg. The hydrogen to feed ratio was 1064 Nl $H_2$/kg feed, and the WHSV was 1.05 kg feed per kg catalyst per hour.

As seen from Table 3, under the operating conditions of 240° C. and 25 barg, 65% of the aromatics are hydrogenated by this catalyst and density is reduced by >0.05 g/mL. The resulting product undergoes ignition in a compression-ignition internal combustion engine, and has a derived cetane number measured according to ASTM 6890 of >35. The low sulfur content of the feed (<50 ppmw) enables the use of a catalyst containing a reduced metal and is key to the product quality. The product meets the aromatic specification of ASTM D975 No. 1 and No. 2 diesel in North America.

TABLE 3

| Fraction | Feed | Product |
| --- | --- | --- |
| Monoaromatics [wt %] | 66.5 | 31.3 |
| Diaromatics [wt %] | 15.1 | BDL |
| Tri+ aromatics [wt %] | 9.3 | 0.4 |
| Total aromatics [wt %] | 90.9 | 31.7 |
| Density at 15° C. [g/mL] | 0.9251 | 0.8717 |

BDL = below detection limits

EXAMPLE 3

Of the Invention

This Example was carried out according to the process illustrated in FIG. 2.

The fractionated combined middle distillate product of Example-1, having a total aromatic content of approximately 83 wt % (measured in accordance with IP-391 method) and a density of 0.9251 g/mL at 15° C., was used as feed to reactor 26 in Table 4.

The catalyst used was a bulk nickel catalyst, commercially available from CRI Catalyst Co under the trade name KL-6516. The nickel on the catalyst was reduced to metallic form before the introduction of the feed.

The feed was processed over KL-6516 at a temperature of 300° C. and a pressure of 50 barg. The hydrogen to feed ratio was 1032 N1 $H_2$/kg feed, and the WHSV was 0.96 kg feed per kg catalyst per hour.

As seen from Table 4, under the operating conditions of 300° C. and 50 barg, 70% of the aromatics are hydrogenated by this catalyst and density is reduced by 0.0575 g/mL. The resulting product undergoes ignition in a compression-ignition internal combustion engine, and has a derived cetane number measured according to ASTM 6890 of >35. The low sulfur content of the feed (<50 ppmw) enables the use of a catalyst containing a reduced metal and is key to the product quality. The product meets the aromatic specification of ASTM D975 No. 1 and No. 2 diesel in North America.

TABLE 4

| Fraction | Feed | Product |
| --- | --- | --- |
| Monoaromatics [wt %] | 66.5 | 23.8 |
| Diaromatics [wt %] | 15.1 | 0.3 |
| Tri+ aromatics [wt %] | 9.3 | 0.8 |
| Total aromatics [wt %] | 90.9 | 25.0 |
| Density at 15° C. [g/mL] | 0.9251 | 0.8616 |

BDL = below detection limits

EXAMPLE 4

Of the Invention

A fractionated middle distillate fraction of the hydroconversion reactor product, having a total aromatic content of approximately 83.1 wt % (as measured using IP-391) and a density of 0.9265 g/mL at 15° C., was used as feed to a hydrodesulfurization reactor. The catalyst used for the hydrodesulfurization step was a sulfided CoMo catalyst supported on an alumina support (commercially available from CRI Catalyst Co as S-4223). The hydrodesulfurization step was carried out at a liquid hourly space velocity of 1 lit feed/lit cat·hr, a pressure of 32 barg, gas-to-oil ratio of 250 normal liter of hydrogen/kg feed, and a temperature of 330° C. The sulfur content of the feed was 12 ppmw before hydrodesulfurization, and nitrogen content was 148 ppmw. After hydrodesulfurization, the product was analyzed to contain about 4 ppmw sulfur and about 1 ppmw nitrogen. There was a marginal density reduction after hydrodesulfurization from 0.9265 g/mL to 0.9220 g/mL, and no significant reduction in aromatics content.

The hydrodesulfurized feed was subjected to a stacked bed catalyst system comprising bulk nickel hydrogenation catalyst KL-6515 at the top and a hydrogenation catalyst comprising noble metals having mild acidity (commercially available from CRI Catalyst Co as S-4213) at the bottom. The volume ratio of KL-6515 catalyst to S-4213 catalyst was 60:40. The hydrodesulfurized feed was processed over the stacked bed system at a liquid hourly space velocity of 0.92 lit feed/lit cat·hr, a pressure of 50 barg and a temperature of 360° C. The hydrogen to feed ratio was maintained at 800 N1 $H_2$/kg feed at reactor inlet. The metal function on both catalysts was reduced to their oxidation state before the introduction of the feed.

TABLE 5

Aromatic content (measured according to IP-391 method) and density for feed and product of Example 4

| Fraction | Feed | Product |
| --- | --- | --- |
| Monoaromatics [wt %] | 57.1 | 15.4 |
| Diaromatics [wt %] | 16.4 | 0.8 |
| Tri+ aromatics [wt %] | 9.6 | 0.2 |
| Total aromatics [wt %] | 83.1 | 16.4 |
| Density at 15° C. [g/mL] | 0.9265 | 0.8256 |

As seen from Table, under the operating conditions of 360° C. and 50 barg, 80% of the aromatics are hydrogenated by this catalyst combination and density is reduced by approximately 0.1 g/mL. The low sulfur content of the feed (<5 ppmw) enables the use of a catalyst containing a reduced metal and is key to the product quality. Furthermore, the upgraded product was found to contain n-paraffins and isoparaffins boiling in the diesel range, while the starting feed did not contain any significant amount of paraffins in the diesel range.

That which is claimed is:

1. A process for producing liquid hydrocarbon products from solid biomass and optionally residual waste feedstocks, said process comprising the steps of:
   a) hydropyrolysing the solid feedstock in a hydropyrolysis reactor vessel in the presence of molecular hydrogen and one or more deoxygenation catalysts to produce a product stream comprising partially deoxygenated hydropyrolysis product, $H_2O$, $H_2$, $CO_2$, CO, $C_1$-$C_3$ gases, char and catalyst fines, wherein the solid feedstock is a lignocellulose-containing biomass;
   b) removing said char and catalyst fines from said product stream;
   c) hydroconverting said partially deoxygenated hydropyrolysis product in a hydroconversion reactor vessel in the presence of one or more hydroconversion catalysts and of the $H_2O$, $CO_2$, CO, $H_2$, and $C_1$-$C_3$ gases generated in step a) to produce a vapour phase product comprising substantially fully deoxygenated hydrocarbon product, $H_2O$, CO, $CO_2$, and $C_1$-$C_3$ gases;
   d) condensing the vapour phase product of step c) to provide a liquid phase product comprising substantially fully deoxygenated C4+ hydrocarbon liquid and aqueous material and separating said liquid phase product from a gas phase product comprising $H_2$, CO, $CO_2$, and $C_1$-$C_3$ gases;

e) removing the aqueous material from the substantially fully deoxygenated C4+ hydrocarbon liquid; and f) hydroprocessing at least a portion of the substantially fully deoxygenated C4+ hydrocarbon liquid in a hydroprocessing reactor vessel in the presence of hydrogen and one or more hydroprocessing catalysts, each hydroprocessing catalyst comprising at least one reduced metal on a solid support, in order to provide an upgraded liquid hydrocarbon stream; wherein the upgraded liquid hydrocarbon stream is reduced in total aromatics content, reduced in benzene content, increased in cetane number or a combination thereof, relative to the substantially fully deoxygenated C4+ hydrocarbon liquid.

2. The process according to claim 1, wherein the gas phase product comprising CO, $CO_2$, and $C_1$-$C_3$ gases is subjected to a reforming and water-gas shift process in order to produce hydrogen.

3. The process according to claim 2, wherein the gas phase product is first purified to remove any sulfur and $NH_3$ present before being subjected to the reforming and water-gas shift process.

4. The process according to claim 2, wherein the hydrogen produced in the reforming and water-gas shift process is used as at least a portion of the molecular hydrogen in at least one of steps a), c) and f).

5. The process according to claim 4, wherein the hydrogen produced in the reforming and water-gas shift process is used to provide all of the hydrogen required in steps a), c) and f).

6. The process according to claim 1, wherein the deoxygenation catalyst comprises one or more sulfided metal selected from the group of nickel, molybdenum, cobalt and tungsten supported on an oxidic carrier selected from alumina, silica, titania, ceria, zirconia, binary oxides, and zeolites.

7. The process according to claim 6, wherein the deoxygenation catalyst comprises either a sulfided nickel/molybdenum catalyst on an alumina support or a sulfided cobalt/molybdenum catalyst on an alumina support.

8. The process according to claim 1, wherein the hydroconversion catalysts comprise one or more sulfided metal selected from the group of nickel, molybdenum, cobalt and tungsten supported on an oxidic carrier selected from alumina, silica, titania, ceria, zirconia, binary oxides, and zeolites.

9. The process according to claim 8, wherein the hydroconversion catalyst comprises either a sulfided nickel/molybdenum catalyst on an alumina support or a sulfided cobalt/molybdenum catalyst on an alumina support.

10. The process according to claim 1, wherein at least one of the one or more hydroprocessing catalysts comprises one or more metals selected from nickel, palladium, platinum, rhodium, iridium and ruthenium on an oxidic support.

11. The process according to claim 1, wherein at least two hydroprocessing catalysts are used.

12. The process according to claim 11, wherein the at least two hydroprocessing catalysts are present in a stacked catalyst bed.

13. The process according to claim 1, wherein before step f), the substantially fully deoxygenated C4+ hydrocarbon liquid is subjected to distillation in order to separate it into fractions according to the ranges of the boiling points of the liquid products contained therein and step f) is carried out on one or more of said fractions.

14. The process according to claim 13, wherein step f) is carried out on a fraction comprising hydrocarbons with boiling points in the range of from 150 to 380° C.

15. The process according to claim 13, wherein step f) is carried out on a fraction comprising hydrocarbons with boiling points in the range of from 90 to 200° C.

16. The process according to claim 1, wherein a hydrodesulfurisation step is carried out before step f).

17. The process according to claim 1, wherein the cetane number is increased by at least about 5 relative to the substantially fully deoxygenated C4+ hydrocarbon liquid.

18. The process according to claim 1, wherein the upgraded liquid hydrocarbon stream is reduced in density relative to the substantially fully deoxygenated C4+ hydrocarbon liquid.

19. The process according to claim 1, wherein the upgraded liquid hydrocarbon stream is reduced in sulphur content, nitrogen content, or both, relative to the substantially fully deoxygenated C4+ hydrocarbon liquid.

20. The process according to claim 1, wherein a total aromatics content, benzene content, or both, of the portion of the substantially fully deoxygenated C4+ hydrocarbon liquid is at least 60%.

* * * * *